United States Patent [19]

Howard

[11] Patent Number: 5,791,188

[45] Date of Patent: Aug. 11, 1998

[54] PROPULSION SYSTEM

[76] Inventor: George J. Howard, 18 W. 58th St., Kansas City, Mo. 64113

[21] Appl. No.: 769,163

[22] Filed: Dec. 17, 1996

[51] Int. Cl.⁶ ................................................. F16H 33/20
[52] U.S. Cl. .................................. 74/84 R; 74/61; 74/845
[58] Field of Search .......................... 74/61, 84 R, 84 S

[56] References Cited

U.S. PATENT DOCUMENTS

| | | | |
|---|---|---|---|
| 1,953,964 | 4/1934 | Laskowitz | 74/84 R |
| 3,810,394 | 5/1974 | Novak | 74/87 |
| 3,878,733 | 4/1975 | Tertinek | 74/61 |
| 3,897,692 | 8/1975 | Lehberger | 74/84 S |
| 3,968,700 | 7/1976 | Cuff | 74/84 S |
| 3,998,107 | 12/1976 | Cuff | 74/84 S |
| 4,095,460 | 6/1978 | Cuff | 74/84 S |
| 4,238,968 | 12/1980 | Cook | 74/84 R |
| 4,242,918 | 1/1981 | Srogi | 74/84 S |
| 4,409,856 | 10/1983 | de Weaver, III | 74/84 R |
| 4,479,396 | 10/1984 | deWeaver, III | 74/84 R |
| 4,577,520 | 3/1986 | Colla | 74/84 R |
| 4,579,011 | 4/1986 | Dobos | 74/84 R |
| 4,744,259 | 5/1988 | Peterson | 74/84 S |
| 4,856,358 | 8/1989 | Montalbano | 74/84 R |
| 4,991,453 | 2/1991 | Mason | 74/84 R |
| 5,042,313 | 8/1991 | Montalbano | 74/84 R |
| 5,156,058 | 10/1992 | Bristow, Jr. | 74/84 R |
| 5,167,163 | 12/1992 | McMahon | 74/84 S |

FOREIGN PATENT DOCUMENTS

| | | | |
|---|---|---|---|
| 59-63375 | 4/1984 | Japan | 74/84 S |

*Primary Examiner*—Allan D. Herrmann
*Attorney, Agent, or Firm*—Chase & Yakimo

[57] ABSTRACT

A propulsion system for converting rotary motion of a pair of weighted rotor arms into linear motion includes a support frame with a drive unit mounted thereto. The drive unit includes a rotatable shaft with a pair of rotor arms pivotally mounted thereto. Upon rotation of the shaft the rotor arms rotate about the shaft. A cone surrounds the rotor arms so as to present a course for rolling movement of the weight elements on said rotor arms. The cone is mounted to a platform which is pivotally mounted to said support frame. Upon movement of said platform and associated cone from a horizontal position the interior surface of the cone presents an asymmetrical course for the weight elements about said shaft. Upon rotation of the shaft the travel of the opposed weight elements through said asymmetrical course produces a resultant linear force on the cone which is transferred to the object attached to the support frame. Accordingly, the rotational movement of the rotor arms with the weight mass thereon is converted into a resultant linear force for driving the object attached thereto.

14 Claims, 2 Drawing Sheets

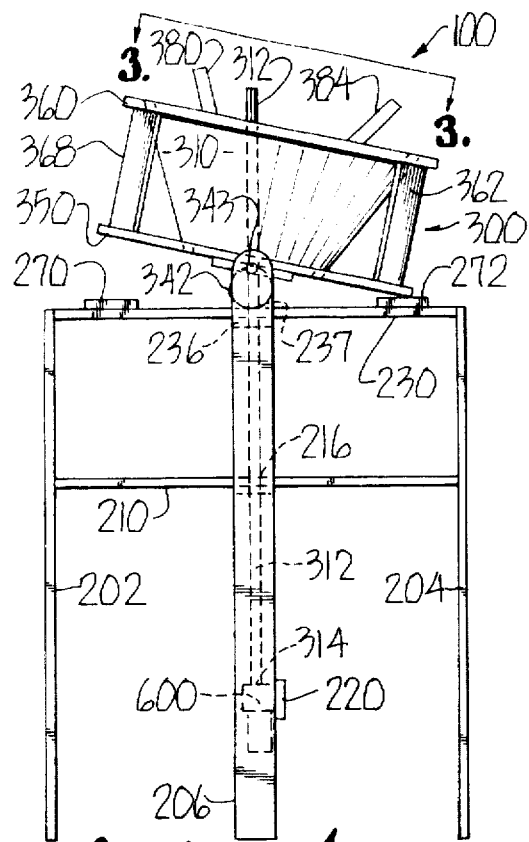
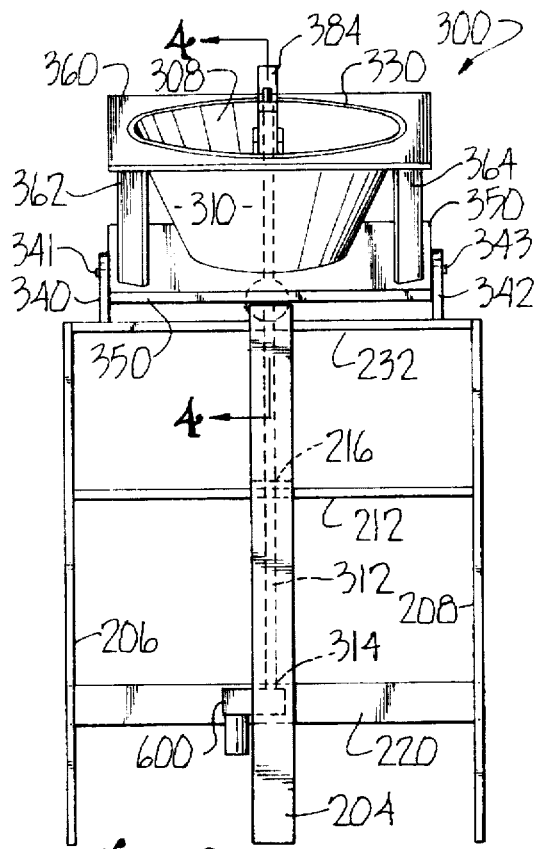
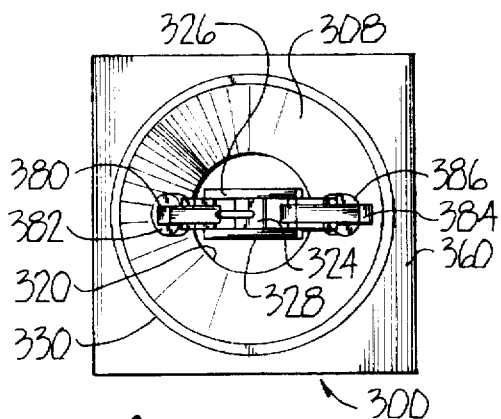
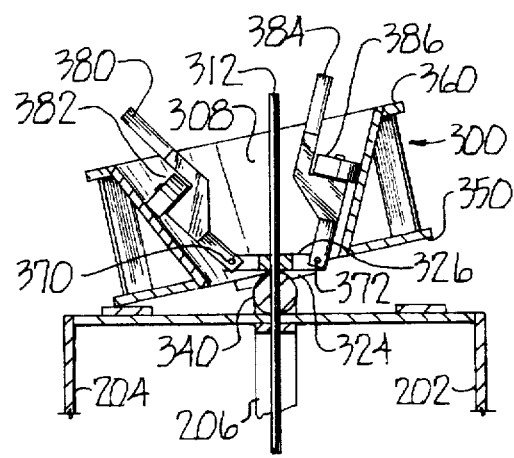

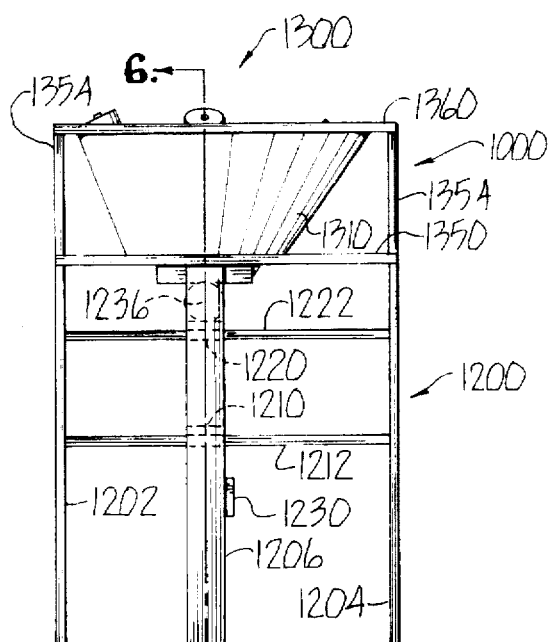
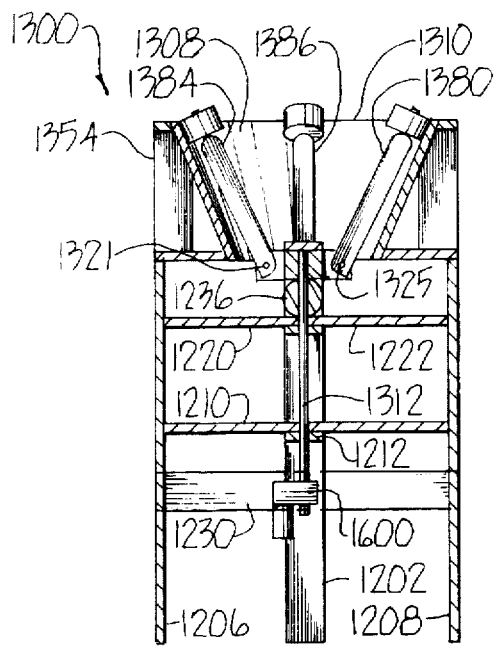
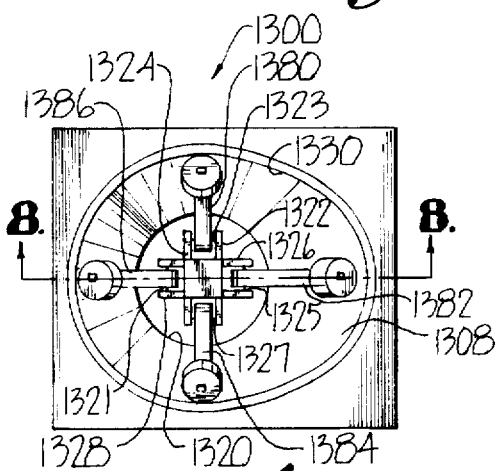
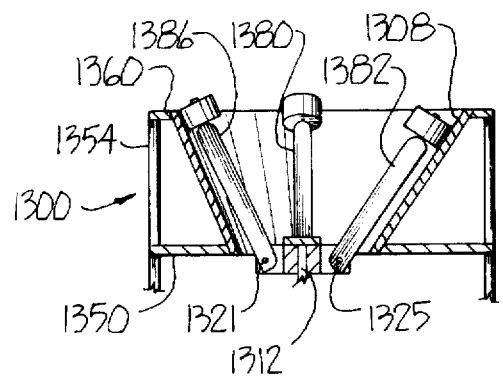
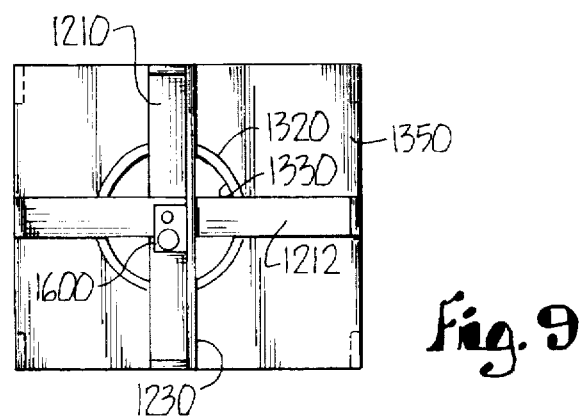

PROPULSION SYSTEM

BACKGROUND OF THE INVENTION

This invention relates to a propulsion system and, more particularly, to a propulsion system which utilizes at least a pair of opposed weighted rotor arms movable about a surface of an asymmetrically positioned cone to produce a resulting linear force for propelling associated objects, e.g. vehicles or the like.

Various types of devices utilize a rotation of mass/weights about a central axis so as to vary their angular velocity and create a resulting force which is variable and unidirectional.

Although presumably effective in operation, many of these devices require complex gear/transmission systems linked to heavy weights all contributing to the bulkiness and weight of the system. Moreover, such devices do not have effective, economic means to produce and regulate the resultant force.

Accordingly, I have devised a propulsion system which addresses these prior art problems. My system utilizes a pair of opposed weights rotatable about a central shaft, the course of the weights being guided by a conical surface surrounding the central shaft. The inclination of the conical course relative to the central shaft is adjustable such that an asymmetric course or track is presented having a first course with a greater travel distance than a second course as measured relative to the fixed central shaft. Accordingly, the momentum of the opposed weights along the different courses will differ according to the course being travelled. In turn, an increase in momentum of the weight travelling through the longer course results which is ultimately translatable into a linear force on the conical surface, this force being transferrable to objects connected to the system. A second embodiment utilizes a fixed asymmetrical course comprising a first fixed longer and second fixed shorter course as opposed to the variously adjustable courses of the first preferred embodiment.

An object of the invention is to provide a propulsion system requiring a single power source to operate the system.

Another object of this invention is to provide a system, as aforesaid, utilizing a pair of opposed, rotating mass elements guided about a conical surface.

A further object of this invention is to provide a system, as aforesaid, using an asymmetrical course relative to the central drive axis of the rotating mass elements.

A still further object of this invention is to provide a system, as aforesaid, wherein the inclination of the course is variously adjustable by the user.

Another object of this invention is to provide a system, as aforesaid, wherein the direction of the resultant force may be regulated between at least first and second opposed directions.

Other objects and advantages of this invention will become apparent from the following description taken in connection with the accompanying drawings, wherein is set forth by way of illustration and example, embodiments of this invention.

BRIEF DESCRIPTION OF THE DRAWINGS

FIG. 1 is a front view of a first embodiment of a propulsion system showing the drive unit tilted relative to a horizontal plane normal to the central drive shaft;

FIG. 2 is a side view of the system of FIG. 1;

FIG. 3 is a top view of the system taken along line 3—3 in FIG. 1;

FIG. 4 is a sectional view taken along line 4—4 in FIG. 2;

FIG. 5 illustrates a front view of an alternative embodiment of the system of FIG. 1;

FIG. 6 is a sectional view taken along line 6—6 in FIG. 5;

FIG. 7 is a top view of the system of FIG. 5;

FIG. 8 is a sectional view taken along line 8—8 in FIG. 7;

FIG. 9 is a bottom view of the system of FIG. 5.

DESCRIPTION OF THE PREFERRED EMBODIMENT

Turning more particularly to the drawings, FIG. 1 shows a first embodiment 100 of the propulsion system as comprising a support frame assembly 200 with a drive unit assembly 300 mounted thereon.

The support frame assembly 200 comprises a plurality of vertical struts 202, 204, 206, 208 having first and second horizontal cross braces 210, 212 extending between opposed pairs of struts 202, 204 and 206, 208. Aperture 216 at the intersection of struts 210, 212 allows for passage of a drive shaft 312 of drive unit 300 therethrough. A brace 220 extends between opposed legs 206, 208 allows for attachment of an energy input means thereon as shown by a battery powered motor 600, the lower end 314 of the drive shaft 312 being affixed thereto.

At the top of the support frame 200 are first and second cross braces 230, 232 with an aperture 236 at the intersection thereof. A top end of the shaft 312 extends through aperture 236. A spacer 237 is positioned adjacent the end of this shaft 312 and atop the intersection of cross braces 230, 232.

Drive unit assembly 300 is mounted atop the support assembly 200. Extending from the opposed longitudinal ends of cross brace 232 is a pair of upstanding flanges 340, 342 having horizontal pivot pins 341, 343 therein. A planar platform 350 is pivotally attached about said pivot pins 341, 343. Stop members 270, 272 are found at the opposed ends of the upper cross brace member 232 so as to limit the pivotable movement of said platform 350 about a horizontal axis defined by pivot pins 341, 343.

Upwardly extending from the platform 350 is a cone 310, the cone 310 having spaced-apart lower 320 and upper 330 apertures with drive shaft 312 extending along the vertical centerline axis of cone 310 when the platform 350 is in a horizontal position. An upper planar platform 360 surrounds the upper aperture 330 with the lower platform 350 surrounding the lower aperture 320. Reinforcing struts 362, 364, 366, 368 extend between the upper 360 and lower 350 platform.

Located about the shaft 312 and adjacent the lower aperture 320 is a spacer 324. First and second parallel arms 326, 328 extend along opposed sides of the spacer 324 with the drive shaft 312 therebetween. First and second pivot pins 370, 372 extend through the opposed free ends of each arm 326, 328.

Pivotally attached about pins 370, 372 in movement toward and away from the shaft are first and second rotor arms 380, 384. Each arm 380, 384 includes a rotatable circular weight element 382, 386 therein, the surface of each weight 382, 386 adapted to roll about the interior surface 308 of cone 310.

Upon pivoting the platform 350 and cone thereon about the pins 341, 343 in first or second directions, the imaginary vertical axis of the cone 310 is displaced from alignment with the vertical axis of fixed shaft 312. As the shaft 312 is fixed, a greater interior surface area 308 of the tilted cone 310 will be positioned to one side of a vertical plane passing through pins 341, 343 and the shaft 312 than the other. Thus, the degree and direction of pivotable movement of the cone 310 about pins 341, 343 regulates the amount of the cone's interior surface area 308 which is positioned on each side of this plane. I refer to these two areas as the greater side/course or track and shorter side/course or track of the cone 310 relative to shaft 312.

In use, the energized motor 600 rotates the shaft 312 causing the rotor arms 380, 384 to rotate about the central shaft 312 with the weight elements 382, 386 rolling about the interior surface 308 of the cone 310. If the cone 310 is in a horizontal position, the opposed sides of the cone 310 relative to shaft 312 are equal. If pivoted to one side or the other, there will be a greater cone interior surface 308 area/side relative to one side of the shaft 312 and the above-described vertical plane passing therethrough than the other.

Upon cone 310 tilting, one rotor arm 380 or 384 will be farther from the shaft 312 than the other opposed arm 384 or 380 when rolling along the greater side/course. The rotor arm passing through the greater side/course must travel a longer distance and thus at a greater velocity than the opposed rotor arm on the shorter side as the rotation of the shaft 312 is constant. As such, the arm on the greater side of the cone will have a greater momentum than the arm of the shorter side.

Thus, the arm on the greater side must give up a portion of its greater momentum as it travels between courses. However, as momentum can neither be lost nor destroyed, the greater momentum must be passed to another body of mass. This momentum is transferred to the cone 310 at the farthest point of the cone relative to the axis of shaft 312 rotation. This transferred momentum results in a force of the cone thereat which is imparted to the object to which the propulsion system 100 is attached.

Thus, it can be seen that the transferred momentum can be adjusted according to the degree of pivotable movement of the cone about pins 341, 343 as the difference between the longer and shorter cone sides/courses can be varied. Also, the direction of the resultant force can be varied in opposed directions according to the direction of inclination of the platform 350/cone 310. It is also understood that a system can be devised allowing the cone 310 to be tilted in all four cardinal directions with the same accompanying advantages and results.

A second embodiment of the invention is as shown in FIGS. 5–9. Again, the device 1000 generally comprises a support assembly 1200 and drive assembly 1300. The support assembly 1200 comprises first and second pairs of opposed vertical struts 1202, 1204, 1206, 1208 having upper and lower cross braces 1210, 1212, 1220, 1222 extending therebetween. A cross brace 1230 extends between struts 1206, 1208 and supports a drive assembly 1300 thereon. A drive shaft 1312 extends through cross braces and has a lower end connected to motor 1600.

A planar platform 1350 is attached to the top of struts and includes aperture 1320 therein. An upper platform 1360 is spaced from lower platform with intermediate support struts 1354 therebetween. Aperture 1330 appears in upper platform 1360. Extending between the platforms 1350, 1360 is a conical structure 1310 with the central vertical axis thereat displaced from the axis of shaft 1312 so as to present an asymmetrical course about shaft 1312.

A spacer 1236 is attached to shaft 1312 with first and second pairs of parallel cross arms 1322, 1324, 1326, 1328 attached thereto. Pivot pins 1321, 1323, 1325, 1327 extend through the free ends of each cross arm 1322, 1324, 1326, 1328. In turn a rotor arm 1380, 1382, 1384, 1386 is pivotally attached thereto.

Each rotor arm, albeit four in number, is as in the first system embodiment and includes the rotatable weight elements, e.g., 382, 386 therein. As shown, two pairs of opposed rotor arms are presented. Accordingly, rotation of the shaft 1312 causes the weight elements of the arms to travel along the interior conical surface 1308 of cone 1310.

As the central axis of the cone 1310 is displaced (right) from the vertical shaft 1312, a larger conical surface area is positioned to one side (right) of shaft 1312 than the other (left). Again, as the velocity of the rotor arms 1380, 1382, 1384, 1386 is controlled by a constant rotation of shaft 1312, the greater momentum of the arms passing through the larger course is transferred to the farthest point of the cone 1310 from shaft 1312 as above described. This transferred momentum results in a linear force acting at the cone furthest from the shaft 1312 which is transferred to the object attached to the system 1000.

As such, this alternative embodiment 1000 presents a fixed asymmetrical course, relative to shaft 1312, for the rotor arms as opposed to the adjustable course as shown in embodiment 100.

It is to be understood that while certain forms of this invention has been illustrated and described, it is not limited thereto except insofar as such limitations are included in the following claims and allowable functional equivalents thereof.

Having thus described the invention, what is claimed as new and desired to be secured by Letters Patent is as follows:

1. A propulsion system comprising:

a support frame;

a shaft attached to said support frame;

means for rotating said shaft about its central longitudinal axis;

at least one cross arm attached to said shaft, said cross arm presenting first and second opposed ends on opposed sides of said shaft;

a pin extending through said opposed ends of said arm;

first and second rotor arms pivotally attached to said pins at opposed ends of said arm in movement towards and away from said shaft axis;

a rotatable weight in each of said rotor arms;

a conical track associated with said frame, said track surrounding said shaft and said rotor arms, said track presenting a course for said rotatable weights upon rotation of said rotor arms by rotation of said shaft, said conical track having a central axis;

means for pivoting the conical track relative to said frame and about a horizontal axis passing through said shaft so as to displace said central axis of said conical track from an alignment with said central longitudinal axis of said shaft, whereby to present an asymmetrical track for said weight elements upon said rotation of said shaft, whereupon a rotation of said arms and weights thereon by said shaft directs said weights along said asymmetrical track to present a resultant force on said conical track at a point displaced from said shaft, said resultant force transferable to an object connected to said support frame.

2. The system as claimed in claim 1 wherein said pivot means comprises:

first and second flanges extending from said support frame;

first and second pivot pins extending through said flanges and defining said horizontal axis extending through said shaft;

a platform for supporting said track and mounted about said pivot pins;

an aperture in said platform for extension of said rotor arms through said platform and into confines of said track;

said platform pivotal between a first horizontal position wherein said central axis of said conical track is aligned with said shaft axis and a second position wherein said central axis intersects said shaft axis, said second platform position presenting said platform and track thereon at a position inclined from said horizontal position, whereby to present said asymmetrical track for said weight elements about said shaft.

3. The system as claimed in claim 1 wherein said resultant force on said conical track acts at a point thereon farthest from said shaft.

4. The system as claimed in claim 1 further comprising means on said frame for limiting said pivotal movement of said track about said horizontal axis.

5. The system as claimed in claim 4 wherein said limit means comprises a stop flange on said frame positioned between said frame and said track, said stop flange contacting said track during pivoting of said track toward said frame.

6. The system as claimed in claim 1 wherein said rotating means comprises energy input means coupled to said shaft to provide said rotating of said shaft.

7. The system as claimed in claim 6 wherein said energy input means comprises a motor.

8. A propulsion system comprising:

a support frame;

a drive shaft;

means for rotating said drive shaft about its central longitudinal axis;

a first rotor arm attached to said shaft in movement forward and away from said shaft axis;

a second rotor arm pivotally attached to said shaft on an opposed side thereof relative to said first rotor arm, said pivotal movement towards and away from said shaft axis;

a weight element on each of said rotor arms;

a track for said weight elements, said track having a central axis;

means for attaching said track to said frame in movement between a first horizontal position which aligns said track axis with said shaft axis and a second position with said track axis intersecting said shaft axis, said second track position presenting an asymmetrical course for said weight elements about said shaft, a rotation of said shaft by said rotating means urging said weight elements along said asymmetrical course whereby to present a resultant force on said track at a point displaced from said shaft, said resultant force transferable to an object connected to said support frame.

9. The system as claimed in claim 8 wherein said attaching means comprises:

first and second flanges extending from said support frame;

first and second pivot pins extending through said flanges and defining a horizontal axis extending through said shaft;

means for pivotally mounting said track about said pivot pins;

said track pivotal between a first position wherein said central axis of said track is aligned with said shaft axis and a second position wherein said track axis intersects said shaft axis, said second position presenting said track thereon at a position inclined from said first horizontal position, whereby to present said asymmetrical course for said weight elements about said shaft.

10. The system as claimed in claim 8 wherein said resultant force on said track acts at a point thereon farthest from said shaft.

11. The system as claimed in claim 8 further comprising means on said frame for limiting said movement of said track between said first and second positions.

12. The system as claimed in claim 11 said wherein said limit means comprises a stop flange on said frame positioned between said frame and said track, said stop flange contacting said track during said movement of said track between said first and second positions.

13. The system as claimed in claim 8 wherein said rotating means comprises energy input means coupled to said shaft to provide said rotation of said shaft.

14. The system as claimed in claim 13 wherein said energy input means comprises a motor.

* * * * *